Dec. 12, 1961 J. F. ELLIS 3,012,806
VEHICLE DOOR SAFETY CORD
Filed June 24, 1959

James F. Ellis
INVENTOR.

United States Patent Office 3,012,806
Patented Dec. 12, 1961

3,012,806
VEHICLE DOOR SAFETY CORD
James F. Ellis, Anderson County, Tenn.
(R.F.D. 2, Powell, Tenn.)
Filed June 24, 1959, Ser. No. 822,532
1 Claim. (Cl. 292—288)

My invention relates to a safety device for the retention of automotive vehicle doors in a closed position and more particularly to a passenger-type vehicle with separate doors for access to the rear section of the vehicle and the forward section; this device is conceived for the retention of the rear doors by a means supplementing the conventional latch or catch and a preventive to small children opening the door while the vehicle is in motion.

Vehicles upon which this invention may be used are dissimilar in body style and outside measurement for the most part, therefore I provide for adjustment or adaptation of my invention to the said vehicle by only a partial assembly, the unassembled portion to effect custom potentials, that is, a length of elastic palstic tubing is firmly adhered to a grooved portion of the shank of a hook of tubular metal and an insert, a plastic covered cord of rayon, nylon or the like for a core and reinforcing agent, extending thru the elastic plastic tubing and hook, with a knot at the exposed end of the hook for an obstruction and preventive against the plastic covered cord's uncontrolled receding. Another hook is provided for the assembly for attachment to the opposite end of the elastic plastic tubing and plastic covered cord when they have been reduced to the desired length. The elastic plastic tubing when slightly elongated serves as a means for securing the remaining assembly to the body of the vehicle and a restraint against vehicle body surface damage.

The principal object of my invention is to supplement standard locking means on the doors of automotive vehicles by a safety cord engaged with the door handles on the outside of the vehicle and with such resistance in the cord assembly as to prevent small children from opening the doors while the vehicle is in motion.

Other objects and features of my invention will be apparent from the following description taken with the accompanying drawing, wherein.

Figure 1:
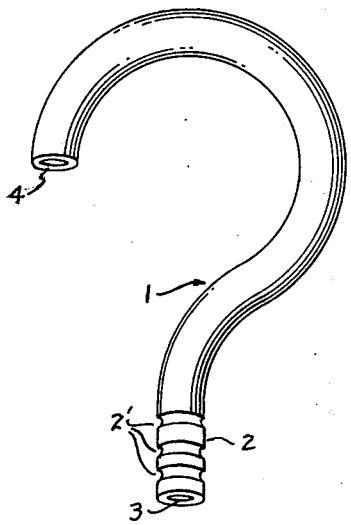
FIG. 1 is a perspective view of a hook of tubular material with a series of grooves at the base or shank.
Figure 2:
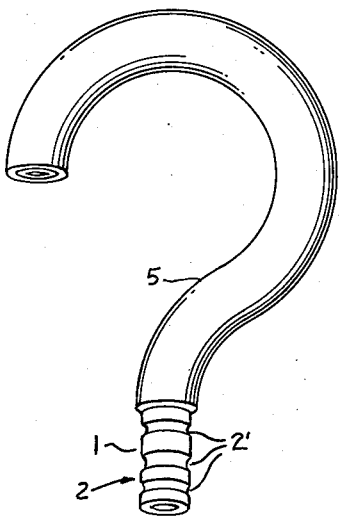
FIG. 2 is a perspective view of the hook encased in a tubing of rubber or the like but terminating at the grooved portion of the shank.
Figure 3:
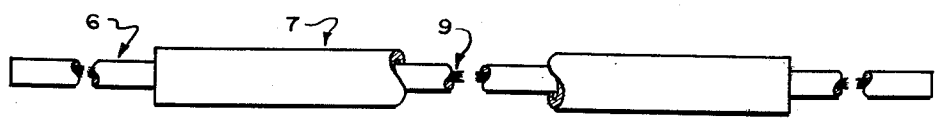
FIG. 3 is a horizontal view of the line assembly; the elastic plastic tubing is broken away to show the plastic covered cord, which is also broken away, and the core.
Figure 4:
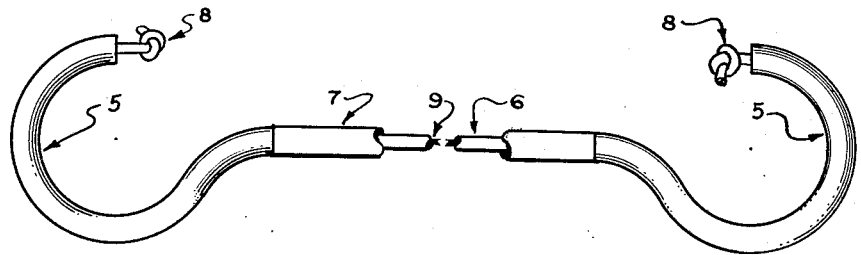
FIG. 4 is a plan view of the end hooks and a fragmentary view of the elastic plastic tube with portions broken away adhered to the hook shank, the plastic covered cord (also broken away) with core as a reinforcing agent and obstructing knots at the exposed ends of the hooks.

Referring now to the drawings, wherein like reference characters designate like parts throughout the several views, there is shown in FIG. 1, a hook made of tubular material made of non-corrosive stainless steel or other material of equal or better quality, with non-cutting edges 4 and a series of grooves 2' at the base or shank 2 and an opening 3 for insertion of the plastic covered cord 6 in FIGS. 3 and 4. The element 5 in FIG. 2 is an encasement fitted over the hook 1 that when engaged with the door handles provides a surface tension for securing the assembled device for its object. An elastic plastic tube 7 is adhered to the shank upon which a series of grooves 2' are provided for additional friction for increasing the gripping strength of the stretched or elongating elastic plastic tube 7 which is of such circumference as would be adaptable to firm adherence over the said grooved shank 2; a cord or the like 6 preferably plastic covered with rayon or nylon core 9 or such other type cover and core as will supply the resistance recognized in the described materials, is inserted in the circular openings 3 and 4 thence longitudinally within the elastic plastic tube and extending beyond the hook openings 3 in such length as to allow for a knot (8) with such surface area as to obstruct the openings 3 and a further extension beyond the opening 3 in the hook 1 as shown in FIG. 4 for tolerance in engaging the hooks 1 and 5 in FIG. 4 with the vehicle door handle.

Although I have described my invention with a certain degree of particularity, it is understood that other embodiments of my invention may be resorted to without departing from the spirit of my invention, consequently I wish it understood that the foregoing description is considered as being illustrative of, rather than limitative upon, the appended claim.

What is claimed is:

A vehicle door safety cord for securing the rear doors of four-door automobiles, whose said doors are hinged to a center post, by attachment to each of the said door handles or grips and by placement outside the vehicle body by the path of shortest distance between said doors, comprising the combination of two plastic-covered tubular metal hooks with a series of circular grooves at their bases or shanks, interconnected with a desired length of elastic plastic tubing connected to the base of each of the hooks by friction against their grooved shanks which are inserted into the ends of the elastic tubing, an inner reinforcing core of plastic-covered rayon or nylon or the like inserted through the entire length of the device and extending out of and knotted at the extreme end of each hook, thus serving as a means of attachment of the hook to the reinforcing core; the said hooks having no eyes at their bases, and the ends of their plastic coverings being flush or even with the ends of the interconnecting elastic tubing, thus eliminating any protruding or exposed hard surface from coming in contact with and marring the vehicle finish.

References Cited in the file of this patent

UNITED STATES PATENTS

| | | |
|---|---|---|
| 2,151,587 | Cassileth | Mar. 21, 1939 |
| 2,908,522 | Glave | Oct. 13, 1959 |

FOREIGN PATENTS

| | | |
|---|---|---|
| 1,068,580 | France | Feb. 3, 1954 |